(12) United States Patent
Sakamoto

(10) Patent No.: US 10,370,987 B2
(45) Date of Patent: Aug. 6, 2019

(54) BLADE OR VANE ROW AND GAS TURBINE

(71) Applicant: MITSUBISHI HITACHI POWER SYSTEMS, LTD., Kanagawa (JP)

(72) Inventor: Yasuro Sakamoto, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 355 days.

(21) Appl. No.: 15/124,563

(22) PCT Filed: Apr. 2, 2015

(86) PCT No.: PCT/JP2015/060494
§ 371 (c)(1),
(2) Date: Sep. 8, 2016

(87) PCT Pub. No.: WO2015/152381
PCT Pub. Date: Oct. 8, 2015

(65) Prior Publication Data
US 2017/0016340 A1    Jan. 19, 2017

(30) Foreign Application Priority Data
Apr. 3, 2014    (JP) .................................. 2014-076770

(51) Int. Cl.
*F01D 11/00* (2006.01)
*F01D 9/04* (2006.01)
(Continued)

(52) U.S. Cl.
CPC ............. *F01D 9/041* (2013.01); *F01D 5/143* (2013.01); *F01D 11/005* (2013.01); *F01D 5/141* (2013.01);
(Continued)

(58) Field of Classification Search
CPC . F01D 5/141; F01D 5/02; F01D 5/081; F01D 5/18; F01D 9/041; F01D 11/006;
(Continued)

(56) References Cited

U.S. PATENT DOCUMENTS 5,382,135 A    1/1995    Green
6,158,961 A *  12/2000   Kehl ....................... F01D 5/141
                                                            29/527.6
(Continued)

FOREIGN PATENT DOCUMENTS

CN    102227545    10/2011
CN    102434287    5/2012
(Continued)

OTHER PUBLICATIONS

Office Action dated May 30, 2017 in corresponding Japanese Patent Application No. 2016-512002 with Machine Translation.
(Continued)

*Primary Examiner* — Justin D Seabe
*Assistant Examiner* — Behnoush Haghighian
(74) *Attorney, Agent, or Firm* — Wenderoth, Lind & Ponack, L.L.P.

(57) ABSTRACT

A blade or vane row including a plurality of blade or vane segments (10), each including a blade or vane body (11), being disposed in a rotational direction to form an annular shape and defining a flow path (R) along which working fluid (G) flows. The blade or vane segments (10) each have an end wall portion (12, 13) that faces the flow path (R) and extends in a rotational direction. The blade or vane body extends from the end wall portion, and the blade or vane body is disposed in the flow path (R). Surfaces (15A, 15B) of the end wall portion (12, 13) in the rotational direction each include an inclined portion (16). The inclined portion is inclined so as to extend to a flow path (R) side and
(Continued)

downstream in a turn direction of the working fluid (G) that flows along the flow path (R).

9 Claims, 6 Drawing Sheets

(51) Int. Cl.
    *F01D 5/14* (2006.01)
    *F01D 5/22* (2006.01)

(52) U.S. Cl.
    CPC ............... *F01D 5/22* (2013.01); *F01D 5/225* (2013.01); *F01D 11/006* (2013.01); *F01D 11/008* (2013.01); *F05D 2240/11* (2013.01); *F05D 2240/80* (2013.01); *F05D 2250/15* (2013.01); *F05D 2250/292* (2013.01); *F05D 2250/38* (2013.01); *Y02T 50/673* (2013.01)

(58) Field of Classification Search
    CPC ............... F01D 25/12; F05D 2220/32; F05D 2240/123; F05D 2240/124; F05D 2240/305; F05D 2240/306; F05D 2240/80
    See application file for complete search history.

(56) References Cited

U.S. PATENT DOCUMENTS

| | | | | |
|---|---|---|---|---|
| 6,210,488 | B1* | 4/2001 | Bruce | B08B 3/12 134/1 |
| 6,261,053 | B1* | 7/2001 | Anderson | F01D 5/08 415/115 |
| 6,270,311 | B1 | 8/2001 | Kuwabara et al. | |
| 6,910,854 | B2* | 6/2005 | Joslin | F01D 5/225 415/139 |
| 7,334,983 | B2* | 2/2008 | Alvanos | F01D 5/081 415/115 |
| 7,481,614 | B2* | 1/2009 | Tomita | F01D 5/22 415/115 |
| 8,137,072 | B2* | 3/2012 | Kim | F01D 5/22 416/190 |
| 9,175,567 | B2* | 11/2015 | Aggarwala | F01D 5/143 |
| 2005/0186074 | A1 | 8/2005 | Tomita et al. | |
| 2010/0111700 | A1 | 5/2010 | Kim et al. | |
| 2010/0124508 | A1 | 5/2010 | Liang | |
| 2013/0315745 | A1* | 11/2013 | Aggarwala | F01D 5/141 416/223 A |
| 2016/0201469 | A1* | 7/2016 | Lewis | F01D 5/081 415/115 |

FOREIGN PATENT DOCUMENTS

| | | |
|---|---|---|
| JP | 7-158403 | 6/1995 |
| JP | 8-135401 | 5/1996 |
| JP | 2000-257447 | 9/2000 |
| JP | 2005-233141 | 9/2005 |
| JP | 2008-121561 | 5/2008 |
| JP | 2010-144578 | 7/2010 |
| JP | 2011-17334 | 1/2011 |
| JP | 2012-52535 | 3/2012 |

OTHER PUBLICATIONS

Office Action dated Mar. 23, 2017 in corresponding Chinese patent application No. 201580012569.2 (with English Translation).
International Search Report dated Jul. 7, 2015 in International Application No. PCT/JP2015/060494 (with English Translation).
Written Opinion of the International Searching Authority dated Jul. 7, 2015 in International Application No. PCT/JP2015/060494 (with English translation).

* cited by examiner

BLADE OR VANE ROW AND GAS TURBINE

TECHNICAL FIELD

The present invention relates to a blade or vane row and a gas turbine including the same.

This application claims priority based on Japanese Patent Application No. 2014-076770 filed in Japan on Apr. 3, 2014, of which the contents are incorporated herein by reference.

BACKGROUND ART

Gas turbines include a rotating shaft capable of rotation, blades, and vanes disposed in a casing. Multiple blades and vanes are disposed, and in the casing, these blades and vanes are alternately disposed along the rotating shaft in the axial direction aligned with the flow direction of a combustion gas.

The blades are influenced by the pressure of the combustion gas flowing through the casing in the axial direction of the rotating shaft and integrally rotate with the rotating shaft about the axis of the rotating shaft.

The vanes are fixed to the casing side and control the flow direction, pressure and flow rate of the combustion gas in the casing.

The blades each include a blade body having an airfoil shape and a platform disposed on an end of the blade body. The platforms are divided in segments around the rotational direction of the rotating shaft. The vanes each include an inner shroud and/or an outer shroud on an end of the vane body. These inner shrouds and outer shrouds are divided into segments around the rotational direction of the rotating shaft in a similar manner to that of the platform of the blades. In other words, the blades are constituted by a plurality of segments, which include the integrally formed blade body and platform, disposed around the rotational direction of the rotating shaft and the vanes are constituted by a plurality of segments, which include the integrally formed vane body and the inner shroud and/or outer shroud, disposed around the rotational direction of the rotating shaft.

Patent Document 1 describes a configuration in which a split ring disposed to the outer peripheral side of the blades is split into a plurality of segments in the rotational direction of the rotating shaft, in a similar manner to that of the platforms described above.

Patent Document 2 describes a structure provided with a seal pin in a pressure side pocket recessed into an end surface of a platform of a blade, for sealing a gap between end surfaces of the blades adjacent in the rotational direction angled in a radial direction.

CITATION LIST

Patent Documents

Patent Document 1: Japanese Unexamined Patent Application Publication No. 2000-257447A
Patent Document 2: U.S. Pat. No. 8,137,072

SUMMARY OF INVENTION

Technical Problem

In configurations provided with segments, such as those described above, gaps are present between the platforms, inner shrouds, and the like of the segments adjacent in the rotational direction. During operation of the gas turbine, a portion of the combustion gas, i.e. the working fluid flowing through the primary flow path, passes through these gaps and escapes from the primary flow path.

As a way to minimize or prevent such leakage of the combustion gas, high pressure sealing air is supplied from these gaps to the primary flow path through which the combustion gas flows. However, sealing air is supplied from the gaps between segments adjacent in the rotational direction. The direction in which the sealing air is supplied corresponds to the radial direction of the rotating shaft orthogonal to the flow of the combustion gas (primary flow) in the axial direction of the rotating shaft of the gas turbine. This results in the supplied sealing air causing loss of the flow of the combustion gas.

The present invention provides a blade or vane segment, a blade or vane row, and a gas turbine capable of decreasing loss of the flow of the working fluid and increasing efficiency.

Solution to Problem

In order to solve the above-described problem, the present invention provides the following means.

A first aspect of the present invention is a blade or vane segment comprising:
an end wall portion that faces a flow path along which a working fluid flows and extends in a rotational direction; and
a blade or vane body extending from the end wall portion, the blade or vane body being disposed in the flow path; wherein
end surfaces of the end wall portion in the rotational direction each include an inclined portion, the inclined portion being inclined extending to a flow path side and downstream in a turn direction of the working fluid that flows along the flow path.

In a configuration in which the inclined portion is provided on the end surface of end wall portion as such, gaps between the end surfaces of adjacent end wall portions are inclined downstream in the turn direction of the working fluid. As a result, less of the working fluid flows into the gaps inclined downstream in the turn direction. Additionally, in configurations in which sealing air is supplied from the gaps to the flow path of the working fluid, the gaps are inclined downstream in the turn direction of the working fluid. As a result, loss of the flow of the primary flow by the sealing air can be decreased.

A second aspect of the present invention is a blade or vane segment according to the first aspect, wherein the inclined portion increases in inclination downstream in the turn direction of the flow path flow as it approaches the flow path.

In such a configuration, even less of the working fluid flows into the gaps, thus enabling loss of the flow of the primary flow by the sealing air to be further decreased.

A third aspect of the present invention is the blade or vane segment according to the first aspect or second aspect, wherein
of the end surfaces, the inclined portion of the end surface disposed upstream in the turn direction increases in inclination downstream in the turn direction of the flow path flow as it approaches the flow path to a greater degree than the inclined portion of the end surface disposed downstream in the turn direction.

In such a configuration, the inclination of the gaps between the end surfaces of the end wall portions is increasingly greater toward the flow path along which the working fluid flows. As a result, even less of the working fluid flows into the gaps. Additionally, in configurations in which the sealing air is supplied from the gaps, loss of the flow of the primary flow can be further decreased.

A fourth aspect of the present invention is the blade or vane segment according to any one of the first to third aspects, wherein a surface facing the flow path of the end wall portion disposed upstream in the turn direction is disposed offset on the flow path side from a surface facing the flow path of the end wall portion disposed downstream in the turn direction.

In such a configuration, even less of the working fluid flows into the gaps. Additionally, in configurations in which the sealing air is supplied from the gaps, loss of the flow of the primary flow can be further decreased.

A fifth aspect of the present invention is the blade or vane segment according to any one of the first to fourth aspects, wherein a seal member holding groove is formed in one of the end surfaces, and the inclined portion is formed on the flow path side of the groove.

In a configuration in which the seal member is disposed as such, the gaps are inclined on the flow path side of the gaps. As a result, less of the working fluid flows into the gaps. Additionally, loss of the flow of the primary flow by the sealing air supplied from the gaps can be decreased.

A sixth aspect of the present invention is the blade or vane segment according to any one of the first to fifth aspects, wherein the end surface includes a radially extending surface, and the inclined portion extends from the radially extending surface on the flow path side inclined downstream in the turn direction.

A seventh aspect of the present invention is a blade or vane row comprising:

a plurality of the blade or vane segments according to any one of the first to sixth aspects, the plurality of blade or vane segments being disposed in a rotational direction to form an annular shape and defining the flow path.

An eighth aspect of the present invention is a gas turbine comprising:

the blade or vane row according to the seventh aspect.

In such a configuration, less of the working fluid flows into the gaps between the adjacent end wall portions. Additionally, loss of the flow of the primary flow by the sealing air supplied from the gaps can be decreased.

A ninth aspect of the present invention is a blade or vane segment comprising:

an end wall portion; and a blade or vane body radially extending from the end wall portion; wherein the end wall portion has an acute angle formed by an end surface of the end wall portion adjacent to a concave ventral surface portion of the blade or vane body and an end wall surface, which is the surface from which the blade or vane body extends.

Advantageous Effects of Invention

The blade or vane segment, blade or vane row, and gas turbine of the present invention are capable of suppressing the flow of the working fluid into the gaps between adjacent end wall portions, and thus decreasing loss of the flow of the working fluid and increasing efficiency.

DESCRIPTION OF EMBODIMENTS

Hereinafter, embodiments of a blade or vane row and a gas turbine according to the present invention will be described with reference to the drawings. However, the present invention is not limited to these embodiments.

First Embodiment

Figure 1:
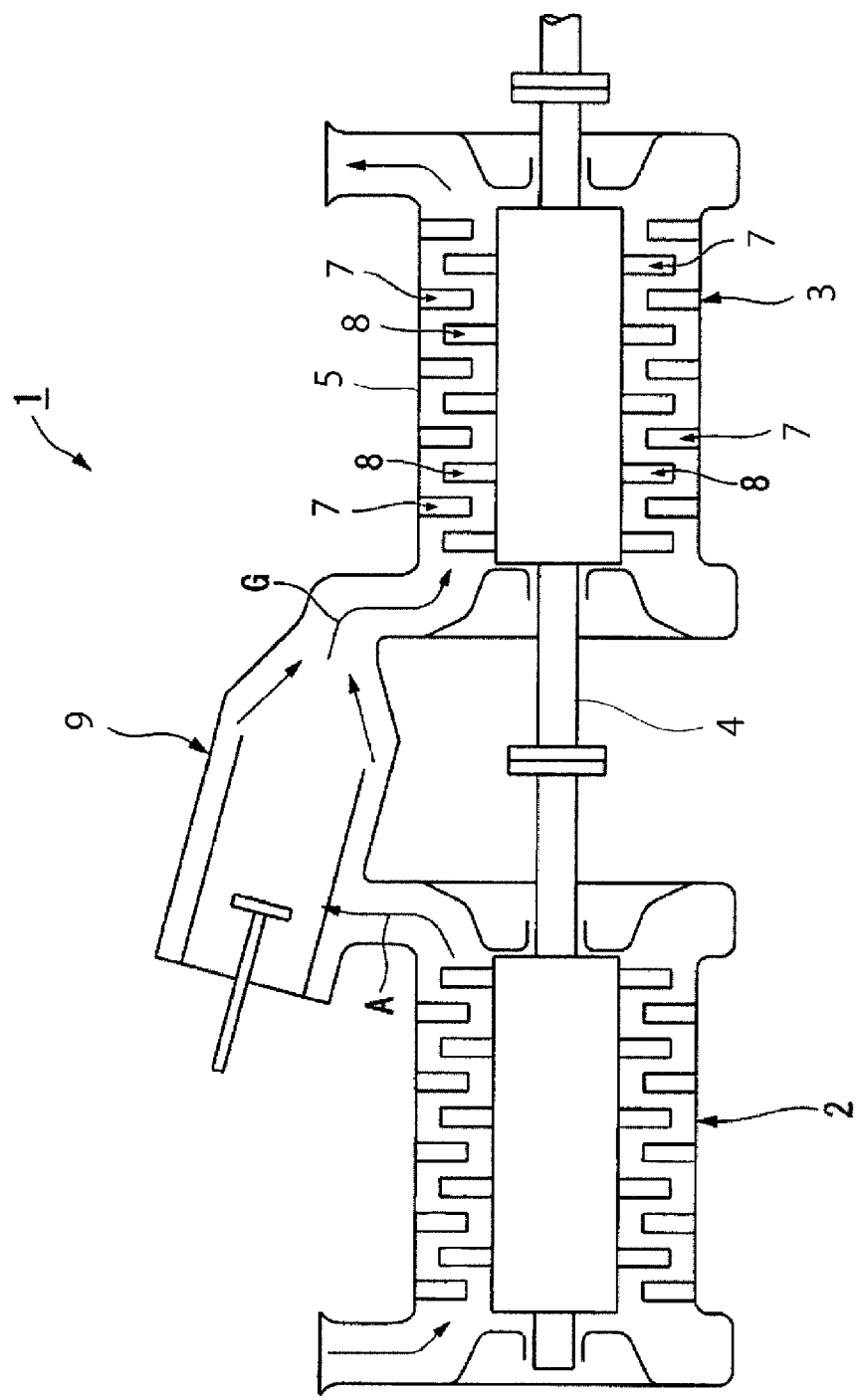
FIG. 1 is a half cross-sectional view schematically illustrating an overview configuration of a gas turbine according to a first embodiment.
Figure 2:
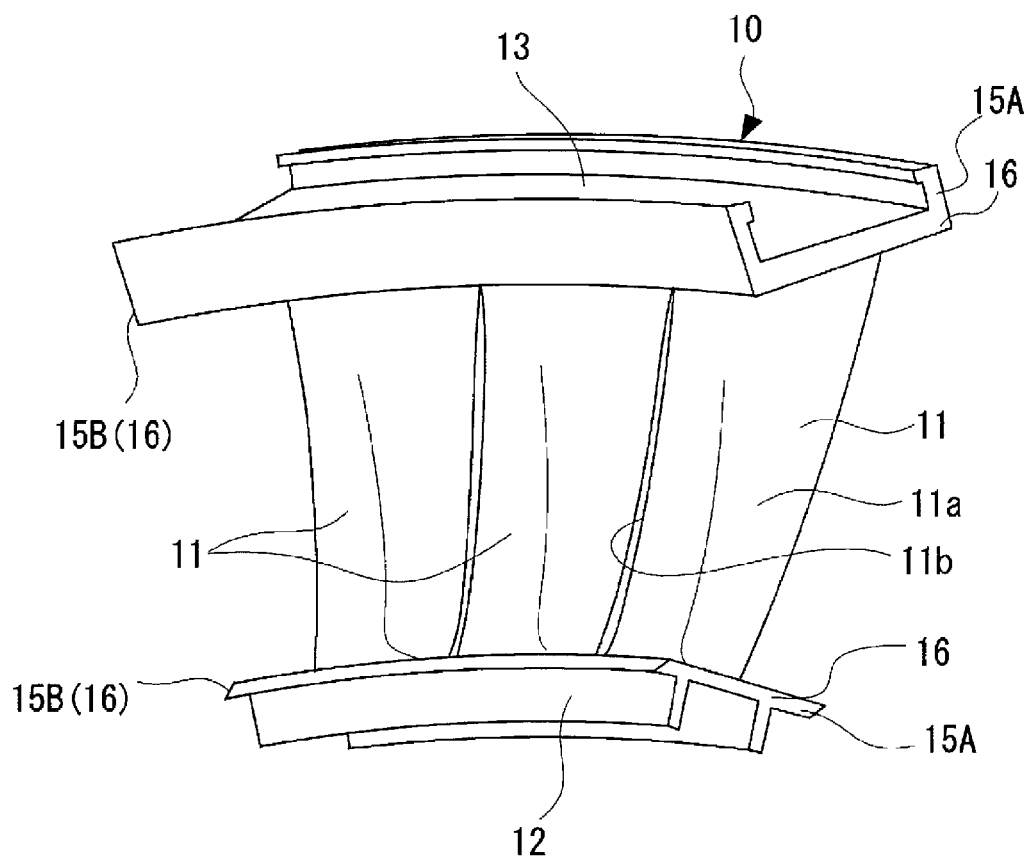
FIG. 2 is a perspective view illustrating a vane segment of a vane included in the gas turbine.
Figure 3:
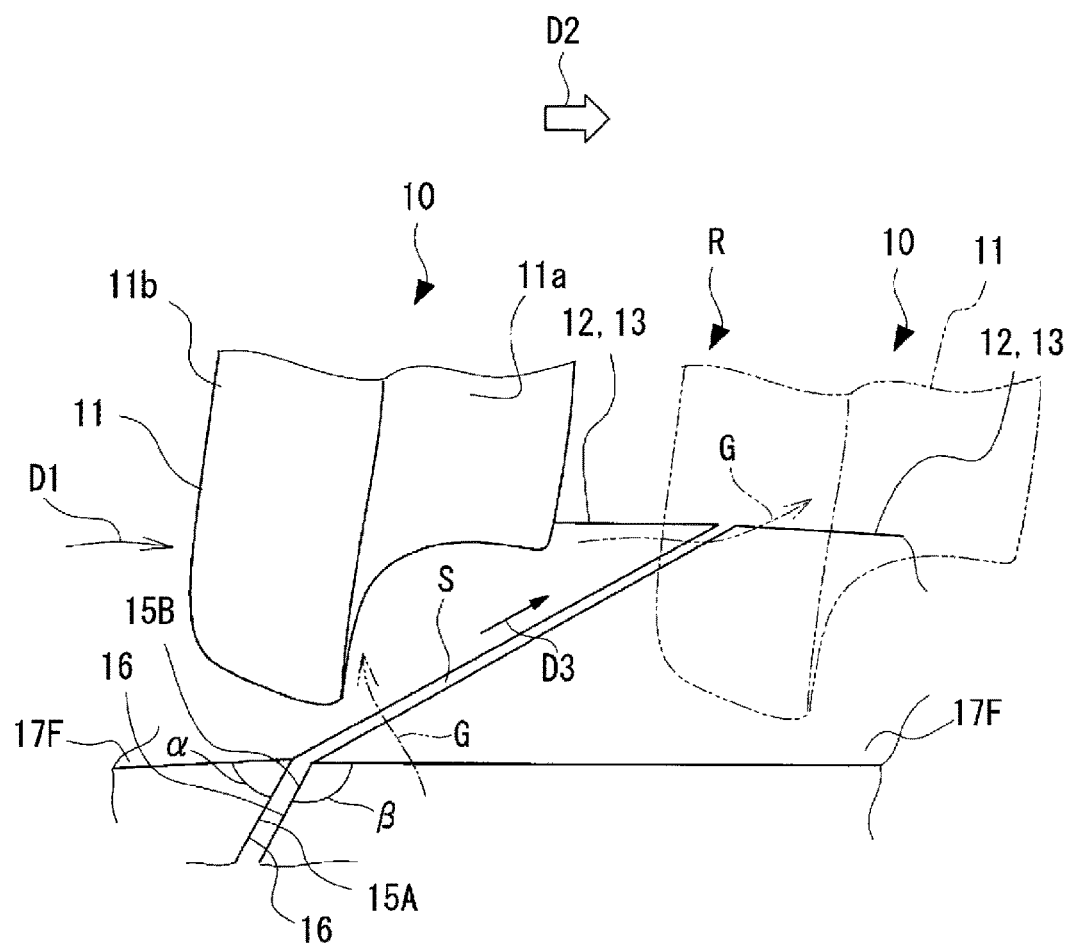
FIG. 3 is a perspective view illustrating a portion where end wall portions of the vane segments are adjacent to one another.
Figure 4:
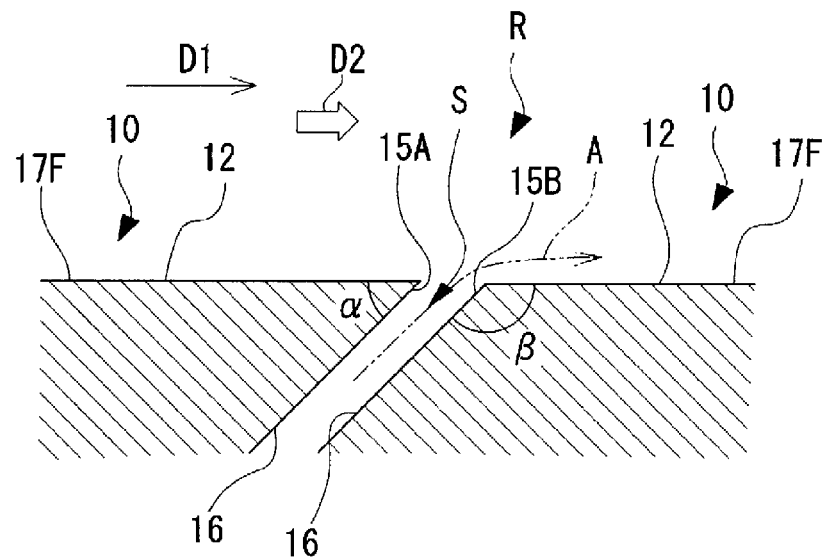
FIG. 4 is a cross-sectional view of the portion where the end wall portions are adjacent to one another.

FIG. 1 is a half cross-sectional view schematically illustrating an overview configuration of a gas turbine according to this embodiment. FIG. 2 is a perspective view illustrating a vane segment of a vane included in the gas turbine. FIG. 3 is a perspective view illustrating a portion where end wall portions of the vane segments are adjacent to one another. FIG. 4 is a cross-sectional view of the portion where the end wall portions are adjacent to one another.

As illustrated in FIG. 1, the gas turbine 1 of this embodiment is provided with a compressor 2, a combustor 9, and a turbine portion (turbine main body) 3.

The compressor 2 takes in air from an air inlet port and generates compressed air.

The combustor 9 is connected to a discharge port of the compressor 2. The combustor 9 jets fuel to the compressed air discharged from the compressor 2 to generate a combustion gas G that has a high temperature and a high pressure.

In the turbine portion 3, energy is extracted from the combustion gas G, i.e. working fluid, fed from the combustor 9, the energy being converted to rotation energy of the rotating shaft 4 which generates driving force. The turbine portion 3 transfers the generated driving force to a generator (not illustrated) coupled to the rotating shaft 4.

The turbine portion 3 includes a vane row (blade or vane row) 7 and a blade row 8 alternately disposed in a casing 5 in the axial direction of the rotating shaft 4. In the turbine portion 3, the combustion gas G flows along the primary flow path R (flow path) formed in the casing 5 in the axial direction of the rotating shaft 4 through the vane row 7 and the blade row 8 while being turned thereby.

The vane row 7 is integrated with the casing 5 at the outer peripheral side thereof. The vane row 7 includes a plurality of vane segments 10 (described above) disposed in the rotational direction. The vane row 7 has an overall annular shape by virtue of the plurality of vane segments 10 being disposed in the rotational direction. The vane row 7, together with the blade row 8 are disposed in the casing 5 of the turbine portion 3 to cover the rotating shaft 4 in the rotational direction and define the primary flow path R along which the combustion gas G flows.

As illustrated in FIG. 2, each of the vane segments 10 includes a vane body 11, an inner end wall portion 12, and an outer end wall portion 13.

The vane body 11 has an airfoil shaped cross section. One face of the vane body 11 is constituted by a concave ventral surface portion 11a. Another face of the vane body 11 is constituted by a convex dorsal surface portion 11b. The vane body 11 extends from the inner end wall portion 12 to the outer end wall portion 13. The vane body 11 is integrated into the turbine portion 3 as part of the vane row 7 to be disposed in the primary flow path R. Specifically, the vane body 11 integrated into the annular vane row 7 extends from the inner end wall portion 12 to the outer end wall portion 13 in the radial direction of the vane row 7.

The inner end wall portion 12 corresponds to an inner shroud. The inner end wall portion 12 is integrated with the vane body 11 at one end of the vane body 11. A plurality of these inner end wall portions 12 are disposed in the rotational direction of the rotating shaft 4 to form an overall annular member around the rotating shaft 4.

The outer end wall portion 13 corresponds to an outer shroud. The outer end wall portion 13 is integrated with the vane body 11 at the other end of the vane body 11. A plurality of these outer end wall portions 13 are disposed in the rotational direction of the rotating shaft 4 to form an overall annular member around the rotating shaft 4 radially outward of the inner end wall portion 12.

In such a manner, the primary flow path R along which the combustion gas G flows is defined between the inner end wall portions 12 and the outer end wall portions 13 of the vane segments 10 of the vane row 7. Additionally, the vane body 11 is disposed in the primary flow path R defined by the inner end wall portions 12 and the outer end wall portions 13.

In FIG. 2, the vane segment 10 includes, for example, three vane bodies 11 disposed between the inner end wall portion 12 and the outer end wall portion 13. However, there is no limitation on the number of vane bodies 11.

The vane segments 10 disposed in the rotational direction circumferentially outward from the rotating shaft 4 are disposed with a gap S between adjacent inner end wall portions 12, 12 and outer end wall portions 13, 13, as illustrated in FIG. 3 and FIG. 4.

The inner end wall portions 12 and the outer end wall portions 13 each include an opposing surface (end surface) 15A, which is an end surface in the rotational direction. Each of these opposing surfaces 15A faces an opposing surface (end surface) 15B, which is an end surface of the inner end wall portion 12 or outer end wall portion 13 of the vane segment 10 adjacent in the rotational direction. In other words, the gap S is formed between the opposing surface 15A and the opposing surface 15B. The opposing surface 15A is the surface downstream in the turn direction D2 of the combustion gas G (to the right of the paper surface in FIG. 3) of the inner end wall portion 12 disposed upstream in the turn direction D2 of the combustion gas G (to the left of the paper surface in FIG. 3). The opposing surface 15B is the surface upstream in the turn direction D2 of the combustion gas G of the inner end wall portion 12 disposed downstream in the turn direction D2 of the combustion gas G.

Note that in the present embodiment, "turn direction D2" refers to the direction of the combustion gas G after being turned by the vane body 11, and the direction of the flow of the combustion gas G in the rotational direction from the ventral surface portion 11a of the vane body 11 toward the dorsal surface portion 11b of the adjacent vane body 11 at the exit side in the axial direction of the vane row 7. As illustrated by the arrow in FIG. 3 and FIG. 4, an upstream side in the turn direction D2 corresponds to the left side of the paper surface in FIG. 4, and a downstream side corresponds to the right side of the paper surface in FIG. 4.

Accordingly, for each of the inner end wall portions 12 and the outer end wall portions 13, the opposing surface 15A is formed on the side upstream in the turn direction D2 and the opposing surface 15B is formed on the side downstream in the turn direction D2.

Using the inner end wall portion 12 as an example, the opposing surfaces 15A, 15B are inclined to the leading side in the rotational direction D1 of the blade row 8 and extend to an end wall surface 17F, which is the surface of the inner end wall portion 12 that faces the primary flow path R from which the vane body 11 extends. In other words, when viewed from the primary flow direction D3 in which the combustion gas G flows along the primary flow path R, which corresponds to the axial direction of the rotating shaft 4, the opposing surfaces 15A, 15B incline extending to the primary flow path R side and downstream with respect to the turn direction D2, which is the direction the combustion gas G flows is turned relative to the vane rows 7. In the present embodiment, as a result of the opposing surfaces 15A, 15B inclining toward the primary flow path R side and downstream with respect to the turn direction D2 of the combustion gas G, an inclined portion 16 is formed.

The opposing surfaces 15A, 15B are inclined with respect to the axial direction of the rotating shaft 4. Specifically, when viewed from the radial direction, the opposing surfaces 15A, 15B extend from the upstream side in the primary flow direction D3 to the downstream side inclining from the upstream side in the turn direction D2 to the downstream side. In other words, the inner end wall portion 12 is a parallelogram when viewed from radially outward.

In a similar manner to that of the inner end wall portion 12, the outer end wall portion 13 includes the inclined opposing surfaces 15A, 15B and the inclined portion 16.

Accordingly, for each of the inner end wall portions 12 and the outer end wall portions 13, the opposing surface 15A is formed on the side upstream in the turn direction D2 and the opposing surface 15B is formed on the side downstream in the turn direction D2. For the inner end wall portion 12 and the outer end wall portion 13, the opposing surface 15A, which is the end surface adjacent to the concave ventral surface portion 11a of the vane body 11, and the end wall surface 17F, which is the surface from which the vane body 11 extends, form an acute angle α. For the inner end wall portion 12 and the outer end wall portion 13, the opposing surface 15B, which is the end surface adjacent to the convex dorsal surface portion 11b of the vane body 11, and the end wall surface 17F form an obtuse angle β. The opposing surface 15B is formed parallel with the opposing surface 15A so that angle β satisfies the equation $\beta = 180° - \alpha$.

In such a manner, having the opposing surfaces 15A, 15B of the inner end wall portion 12 and the outer end wall portion 13 inclined to form the inclined portion 16 results in the gap S between the opposing surfaces 15A, 15B of adjacent inner end wall portions 12 and outer end wall portions 13 being inclined downstream in the turn direction D2 of the combustion gas G with respect to the radial direction of the vane row 7. In other words, the gap S is formed to open from the end wall surface 17F toward the downstream side in the turn direction D2 at the region near the end wall surface 17F where merging with the primary flow path R occurs. Thus, for the combustion gas G that flows along the primary flow path R to flow into the gaps S, it needs to flow against the flow of the primary flow path R. This makes less of the combustion gas G flowing along the primary flow path R between the inner end wall portion 12 and the outer end wall portion 13 flow into the gaps S inclined downstream in the turn direction D2.

In configurations in which sealing air A is supplied from the gaps S to the primary flow path R, the gaps S are inclined to the downstream side in the turn direction D2 of the combustion gas G. Thus, the sealing air A is fed in a diagonal manner with respect to the primary flow path R along which the combustion gas G flows. Additionally, when the combustion gas G flows into the gaps S, the pressure in the primary flow path R decreases as it flows from upstream to downstream in the primary flow direction D3, which is the direction the combustion gas G flows in the primary flow path R in the axial direction of the rotating shaft 4. Accordingly, the combustion gas G that flows in the gaps S from the upstream side in the primary flow direction D3 flows out of the gaps S into the primary flow path R at the downstream side in the primary flow direction D3. The combustion gas G that flows out here is also fed in a diagonal manner with respect to the primary flow path R. Accordingly, the sealing air A and the combustion gas G that flows out from the gaps S merge with the combustion gas G flowing along the primary flow path R at a lower angle of intersection, thus decreasing loss of the flow of the combustion gas G along the primary flow path R.

As described above, having the opposing surfaces 15A, 15B of the inner end wall portion 12 and the outer end wall portion 13 inclined to form the inclined portion 16 allows the combustion gas G to be prevented from flowing into the gaps S between adjacent inner end wall portions 12 and outer end wall portions 13. As a result, loss of the flow of the combustion gas G is decreased and the efficiency of the gas turbine 1 can be increased.

In configurations in which the sealing air A is supplied to the primary flow path R from the gaps S, loss of the flow of the combustion gas G by the sealing air A can be decreased and the efficiency of the gas turbine 1 can be increased.

In addition, the sealing air A flows out from the gaps S with good efficiency, thus increasing the cooling effects by the sealing air A on the inner end wall portion 12 and the outer end wall portion 13.

Modification of First Embodiment

In the embodiment described above the opposing surfaces 15A, 15B that form the inclined portion 16 are planar surfaces, but are not limited thereto. Hereinafter, an example of the inner end wall portion 12 is given as a modified example. Note that this modified example can also be applied to the outer end wall portion 13.

First Modified Example

Figure 5:
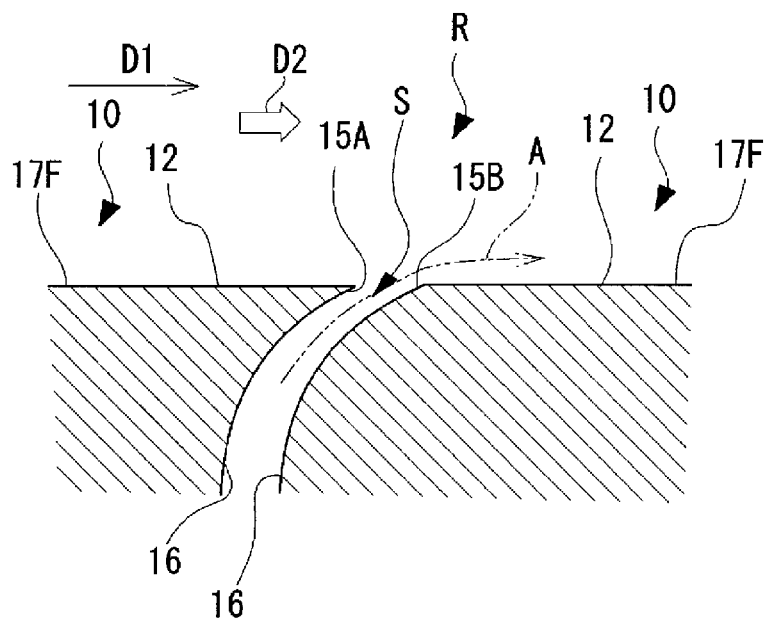
FIG. 5 is a cross-sectional view illustrating a configuration of a first modified example of an opposing surface formed on the end wall portion.

FIG. 5 is a cross-sectional view illustrating a configuration of the first modified example of an opposing surface formed on the end wall portion described above.

As illustrated in FIG. 5, the inclined portions 16 of the opposing surfaces 15A, 15B of the inner end wall portions 12 adjacent in the rotational direction are formed in a curved manner, gradually increasing in inclination downstream in the turn direction D2 of the combustion gas G that flows along the primary flow path R as it approaches the end wall surface 17F that faces the primary flow path R.

The inclination of the gap S between opposing surfaces 15A, 15B of adjacent inner end wall portions 12 of such a configuration increases in inclination as it approaches the end wall surface 17F that faces the primary flow path R. As a result, the gaps S at the end wall surface 17F are formed to open with a sharper angle toward the upstream side in the turn direction D2. Thus, the combustion gas G is even less likely to flow into the gaps S. Additionally, in configurations in which the sealing air A is supplied from the gaps S, the angle of intersection between the direction the sealing air A flows out and the flow direction of the combustion gas G is smaller. As a result, loss of the flow of the combustion gas G can be further decreased.

Second Modified Example

Figure 6:
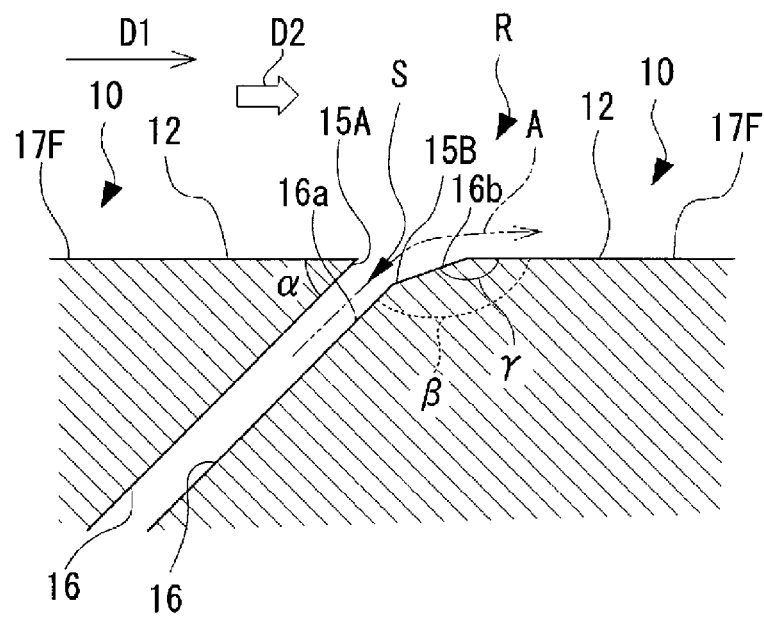
FIG. 6 is a cross-sectional view illustrating a configuration of a second modified example of an opposing surface formed on the end wall portion.

FIG. 6 is a cross-sectional view illustrating a configuration of the second modified example of an opposing surface formed on the end wall portion described above.

As illustrated in FIG. 6, the inner end wall portion 12 disposed on the downstream side in the turn direction D2 of the combustion gas G of inner end wall portions 12 adjacent in the rotational direction includes a modified inclined portion 16 of the opposing surface 15B of the upstream side in the turn direction D2 of the combustion gas G. Specifically, the inclined portion 16 of the opposing surface 15B may be formed to extend toward the downstream side in the turn direction D2 to a greater degree than the inclined portion 16 of the opposing surface 15A as it approaches the end wall surface 17F. The inclined portion 16 of the opposing surface 15B of the second modified example described here includes a first inclined portion 16a and a second inclined portion 16b. The first inclined portion 16a is parallel with the inclined portion 16 of the opposing surface 15A. The second inclined portion 16b has a greater inclination angle than that of the first inclined portion 16a. Accordingly, for the inner end wall portion 12 and the outer end wall portion 13, in embodiments, such as the first embodiment, in which the angle formed by the first inclined portion 16a and the end wall surface 17F is angle β, an angle γ formed by the second inclined portion 16b and the end wall surface 17F is greater than the angle β.

In such configurations, the inclination of the gaps S between the opposing surfaces 15A, 15B of the inner end wall portion 12 increases in inclination as they approaches the end wall surface 17F. As a result, loss of the flow of the combustion gas G can be further decreased even in configurations in which the sealing air A is supplied from the gaps S.

Third Modified Example

Figure 7:
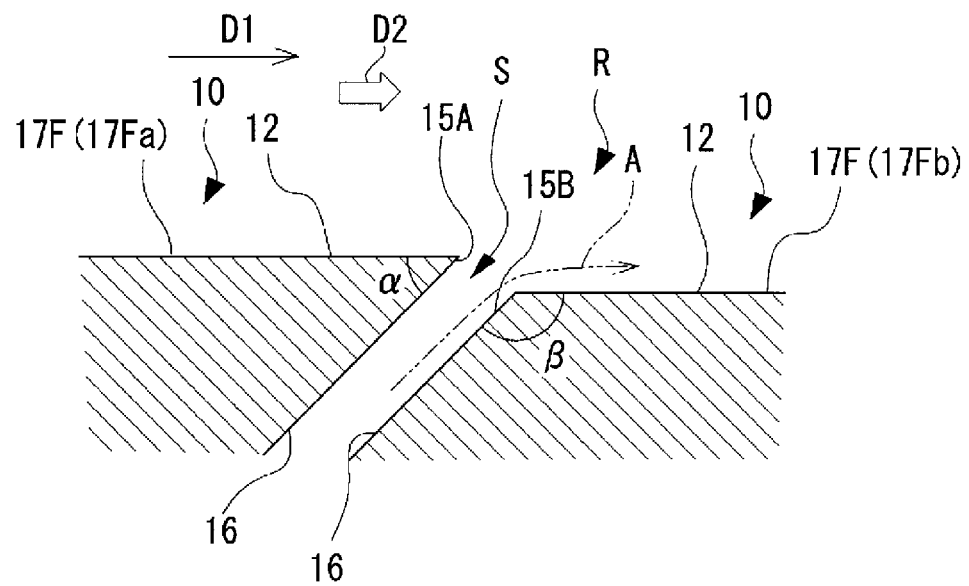
FIG. 7 is a cross-sectional view illustrating a configuration of a third modified example of an opposing surface formed on the end wall portion.

FIG. 7 is a cross-sectional view illustrating a configuration of the third modified example of an opposing surface formed on the end wall portion described above.

As illustrated in FIG. 7, the end wall surface 17F that faces the primary flow path R of the inner end wall portions 12 adjacent in the rotational direction may be disposed in a manner in which an end wall surface 17Fb of the inner end wall portion 12 disposed downstream in the turn direction D2 is offset on the primary flow path R side from an end wall surface 17Fa of the inner end wall portion 12 disposed upstream in the turn direction D2. In other words, the end wall surface 17Fb downstream in the turn direction D2 is formed to be a step lower inward in the radial direction of the blade row 8 with respect to the end wall surface 17Fa upstream in the turn direction D2.

In such a configuration, the combustion gas G is even less likely to flow into the gaps S. In configurations in which the sealing air A is supplied from the gaps S, the sealing air A that flows out from the gaps S follows the end wall surface 17Fb formed to be a step lower with respect to the upstream end wall surface 17Fa. As a result, the sealing air A is prevented from immediately flowing out from the gaps S and merging with the combustion gas G flowing along the primary flow path R. This allows loss of the flow of the combustion gas G along the primary flow path R to be decreased.

Fourth Modified Example

Figure 8:
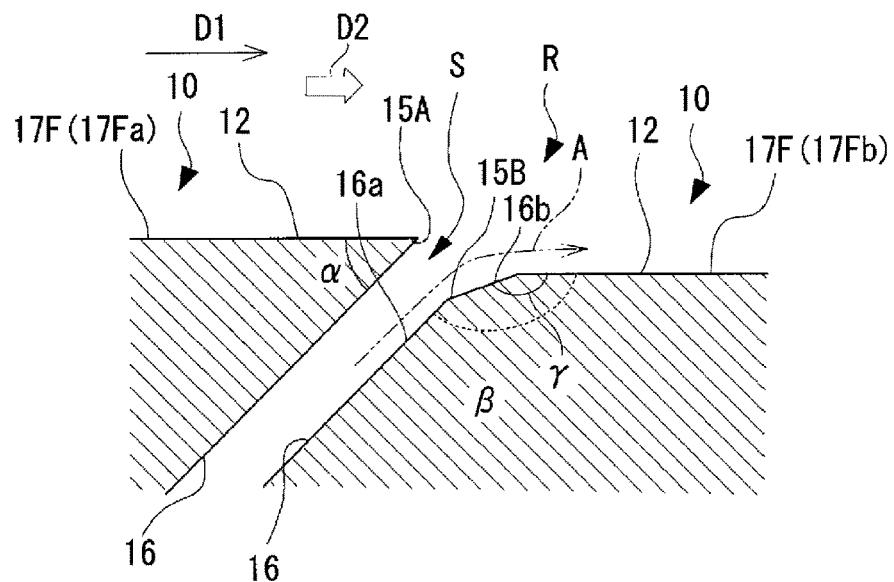
FIG. 8 is a cross-sectional view illustrating a configuration of a fourth modified example of an opposing surface formed on the end wall portion.

FIG. 8 is a cross-sectional view illustrating a configuration of the fourth modified example of an opposing surface formed on the end wall portion described above.

The fourth modified example illustrated in FIG. 8 is a combination of the second modified example and the third modified example described above. In other words, the opposing surface 15B disposed downstream in the turn direction D2 of the combustion gas G of the opposing surfaces 15A, 15B adjacent in the rotational direction includes an inclined portion 16 formed to extend downstream in the turn direction D2 to a greater degree as it approaches the end wall surface 17F. Additionally, the end wall surface 17Fb disposed downstream in the turn direction D2 is offset on the vane body 11 side from the end wall surface 17Fa disposed upstream in the turn direction D2.

In such a configuration, the combustion gas G is even less likely to flow into the gaps S. In addition, in configurations in which the sealing air A is supplied from the gaps S, loss of the flow of the combustion gas G by the sealing air A flowing out from the gaps S can be further decreased.

Other Modified Examples

In the first embodiment and the modified examples described above, the inclined portion 16 is formed across the entire region of the opposing surfaces 15A, 15B. However this is not a limitation. The inclined portion 16 is only required to be formed in regions of the opposing surfaces 15A, 15B close to the end wall surface 17F that faces the primary flow path R of the combustion gas G.

Second Embodiment

Next, a blade or vane row and gas turbine of the second embodiment according to the present invention will be described. Note that in the following description of the second embodiment, components common to the first embodiment described above are given the same reference sign in the drawings and explanations thereof are omitted.

Figure 9:
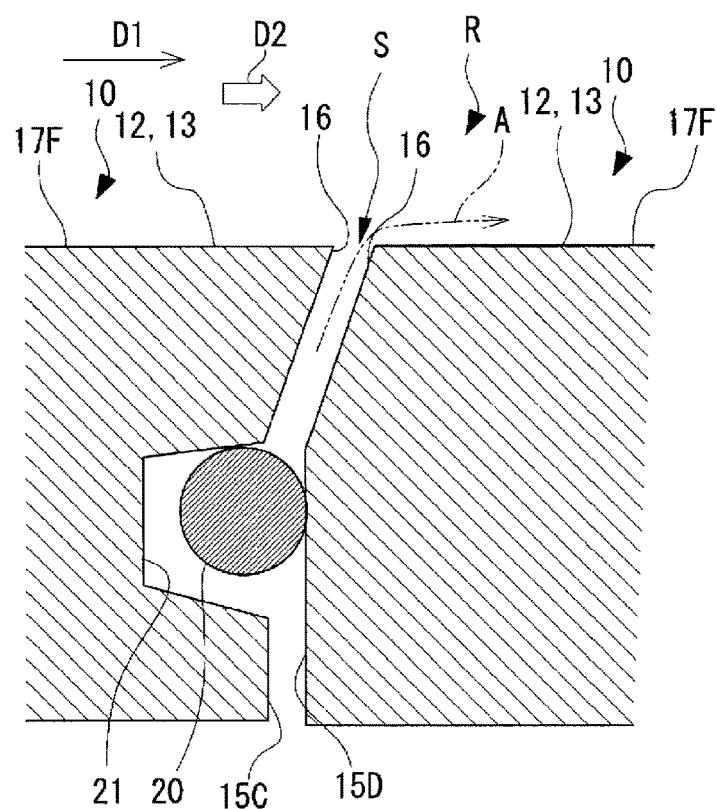
FIG. 9 is a cross-sectional view illustrating a portion where end wall portions of vane segments are adjacent to one another, in a gas turbine according to a second embodiment.

FIG. 9 is a cross-sectional view illustrating a portion where end wall portions of vane segments are adjacent to one another, in a gas turbine according to the second embodiment.

As illustrated in FIG. 9, the inner end wall portions 12 and the outer end wall portions 13 each include opposing surfaces (end surfaces) 15C, 15D, which are opposing surfaces of the inner end wall portions 12 and the outer end wall portions 13 of vane segments 10 adjacent in the rotational direction. In other words, the gaps S are formed between the opposing surface 15C and the opposing surface 15D. The opposing surface 15C is the surface downstream in the turn direction D2 of the combustion gas G of the inner end wall portion 12 disposed upstream in the turn direction D2 of the combustion gas G. The opposing surface 15D is the surface upstream in the turn direction D2 of the combustion gas G of the inner end wall portion 12 disposed downstream in the turn direction D2 of the combustion gas G.

In the gaps S, a groove 21 is formed in one of the opposing surfaces, the opposing surface 15C, to hold a seal member 20. The seal member 20 is accommodated in the groove 21, disposed between the opposing surfaces 15C, 15D. This prevents the combustion gas G from leaking out from the primary flow path R. Specifically, the seal member 20 of the present embodiment is a cylindrical seal pin.

Note that the seal member 20 is not limited to the seal pin of the present embodiment and is not limited in kind with the proviso that it can minimize or prevent leakage of the combustion gas G. Other examples of the seal member 20 include a planar seal plate.

The inclined portion 16 is formed on the primary flow path R side of the seal member 20 in the opposing surfaces 15C, 15D. In other words, a surface radially extending vertically with respect to the end wall surface 17F is formed in the opposing surfaces 15C, 15D. The inclined portion 16 is formed extending from this surface to the primary flow path R side inclined downstream in the turn direction D2.

In a configuration in which the gaps S are inclined on the primary flow path R side, less of the combustion gas G flows into the gaps S. Additionally, loss of the flow of the primary flow by the sealing air A supplied from the gaps S can be decreased.

Accordingly, as described above, a configuration in which the inclined portion 16 is disposed in the opposing surfaces 15C, 15D of the inner end wall portion 12 and the outer end wall portion 13 on the end wall surface 17F side of the seal member 20, loss of the flow of the combustion gas G can be decreased and efficiency of the gas turbine 1 can be increased.

Other Embodiments

Note that the vane row and gas turbine of the present invention are not limited by the embodiments described above with reference to the drawings, and various modified examples permissible by the technical scope are possible.

In the embodiments described above, the inner end wall portion 12 and the outer end wall portion 13 are both provided with the inclined portion 16. However, the inclined portion 16 may be only provided in one of either the inner end wall portion 12 or the outer end wall portion 13.

In the embodiments described above, reference is made to configurations in which sealing air A is supplied from the gaps S to the primary flow path R. However, the above embodiments are applicable to configurations in which the sealing air A is not supplied.

In the embodiments described above, the opposing surface 15B is parallel with the opposing surface 15A with angle $\beta$ satisfying the equation $\beta = 180° - \alpha$. However, the embodiments of the present invention are not limited to this angle. For example, the angle $\beta$ may be a value such that the opposing surface 15B and the opposing surface 15A are not parallel.

In the embodiments and the modified examples described above, the inclined portion 16 is provided on the vane row 7. However, a similar configuration can be applied to the blade row 8. In configurations in which the blade row 8 has such a configuration, the platform from which a blade body and a blade root extend corresponds to the end wall portion of the present invention.

Besides the embodiments described above, as long as spirit of the present invention is maintained, configurations exemplified in the embodiments described above can be selected as desired, or can be changed to other configurations as appropriate.

Another modified example is a vane segment of a tenth aspect of the present invention. This vane segment includes an inner shroud that faces the flow path along which the working fluid flows and extends in the rotational direction, an outer shroud disposed radially outward of the inner shroud that faces the flow path and extends in the rotational direction, and a vane body that radially extends from the inner shroud to the outer shroud. An end surface of the inner shroud and the outer shroud in the rotational direction includes an inclined portion. These inclined portions are inclined extending to the flow path side and downstream in a turn direction of the working fluid that flows along the flow path.

In a configuration in which the inclined portion is provided on the end surface of the inner shroud and the outer shroud as such, gaps between the end surfaces of adjacent inner shrouds and outer shrouds are inclined downstream in the turn direction of the working fluid. As a result, less of the working fluid flows into the gaps inclined downstream in the turn direction. Additionally, in configurations in which sealing air is supplied from the gaps to the flow path of the working fluid, the gaps are inclined downstream in the turn direction of the working fluid. As a result, loss of the flow of the primary flow by the sealing air can be decreased.

A vane segment of an eleventh aspect of the present invention has a configuration similar to that of the tenth aspect, except that the inclined portion increases in inclination extending downstream in the turn direction of the flow path flow, as it approaches the flow path.

In such a configuration, the working fluid is even less likely to flow into the gaps, thus enabling loss of the flow of the primary flow by the sealing air to be further decreased.

A vane segment of a twelfth aspect of the present invention has a configuration similar to that of the tenth aspect or the eleventh aspect, except that the inclined portion of the end surface disposed upstream in the turn direction increases in inclination downstream in the turn direction of the flow path flow, as it approaches the flow path to a greater degree than the inclined portion of the end surface disposed downstream in the turn direction.

In such a configuration, the inclination of the gaps between the end surfaces of the inner shrouds and the outer shrouds is increasingly greater toward the flow path along which the working fluid flows. As a result, the working fluid is even less likely to flow into the gaps. Additionally, in configurations in which the sealing air is supplied from the gaps, loss of the flow of the primary flow can be further decreased.

A vane segment of a thirteenth aspect of the present invention has a similar configuration to that of any one of the tenth aspect to the twelfth aspect, except that surfaces of the inner shroud and the outer shroud that face the flow path and are disposed upstream in the turn direction are offset on the flow path side from surfaces of the inner shroud and the outer shroud that face the flow path and are disposed downstream in the turn direction.

In such a configuration, the working fluid is even less likely to flow into the gaps. Additionally, in configurations in which the sealing air is supplied from the gaps, loss of the flow of the primary flow can be further decreased.

A vane segment of a fourteenth aspect of the present invention has a configuration similar to that of any one of the tenth aspect to the thirteenth aspect, except that a groove in which a seal member is held is formed in one of the surface ends and the inclined portion is formed on the flow path side of the groove.

In a configuration in which the seal member is disposed as such, the gaps are inclined on the flow path side of the gaps. As a result, less of the working fluid flows into the gaps. Additionally, loss of the flow of the primary flow by the sealing air supplied from the gaps can be decreased.

A vane segment of a fifteenth aspect of the present invention has a configuration similar to that of any one of the tenth aspect to the fourteenth aspect, except that the end surfaces each include a radially extending surface, and the inclined portions incline from the radially extending surface on the flow path side and incline downstream in the turn direction.

A vane row of a sixteenth aspect of the present invention defines the flow path with a plurality of the vane segments of any one of the tenth aspect to the fifteenth aspect being disposed in the rotational direction to form an annular shape.

A gas turbine of a seventeenth aspect of the present invention includes the vane row of the sixteenth aspect.

In such a configuration, less of the working fluid flows into the gaps between the adjacent inner shrouds and outer shrouds. Additionally, loss of the flow of the primary flow by the sealing air supplied from the gaps can be decreased.

Another modified example is a vane segment of a eighteenth aspect of the present invention. This vane segment includes an inner shroud that faces the flow path along which the working fluid flows and extends in the rotational direction, an outer shroud disposed radially outward of the inner shroud that faces the flow path and extends in the rotational direction, and a vane body that radially extends from the inner shroud to the outer shroud. End surfaces of the inner shroud and the outer shroud in the rotational direction include an inclined portion. This inclined portion is inclined extending from upstream to downstream in the axial direction and from the upstream side to the downstream side in the turn direction of the working fluid; and is inclined extending to the flow path side and downstream of a turn direction of the flow path flow.

In a configuration in which the inclined portion is provided on the end surface of the inner shroud and the outer shroud as such, gaps between the end surfaces of adjacent inner shrouds and outer shrouds are inclined downstream in the turn direction of the working fluid extending from upstream to downstream in the axial direction. As a result, the difference between the angle of the gap and the angle of the primary flow along the flow path is decreased, thus the flow of the working fluid through the gaps can be decreased. Accordingly, loss caused by the working fluid flowing into the gaps can be decreased and mixing of the working fluid from the gaps and the primary flow can be reduced.

Additionally, in configurations in which sealing air is supplied from the gaps to the working fluid flow path side, the gaps are inclined in the axial direction and the radial direction. As a result, the angle of intersection where the sealing air and the working fluid that flows along the flow path merge can be decreased, and thus loss of the flow of the working fluid that flows along the flow path can be effectively decreased.

A vane segment of an nineteenth aspect of the present invention has a configuration similar to that of the eighteenth aspect, except that the inclined portion increases in inclination downstream in the turn direction of the flow path flow, as it approaches the flow path.

In such a configuration, the working fluid is even less likely to flow into the gaps, thus enabling loss of the flow of the primary flow by the sealing air to be further decreased.

A vane segment of a twentieth aspect of the present invention has a configuration similar to that of the eighteenth aspect or the nineteenth, except that the inclined portion of the end surface disposed upstream in the turn direction increases in inclination downstream in the turn direction of the flow path flow, as it approaches the flow path to a greater degree than the inclined portion of the end surface disposed downstream in the turn direction.

In such a configuration, the inclination of the gaps between the end surfaces of the inner shrouds and the outer shrouds is increasingly greater toward the flow path along which the working fluid flows. As a result, the working fluid is even less likely to flow into the gaps. Additionally, in configurations in which the sealing air is supplied from the gaps, loss of the flow of the primary flow can be further decreased.

A vane segment of a twenty-first aspect of the present invention has a similar configuration to that of any one of the eighteenth aspect to the twentieth aspect, except that surfaces of the inner shroud and the outer shroud that face the flow path and are disposed upstream in the turn direction are offset on the flow path side from surfaces of the inner shroud and the outer shroud that face the flow path and are disposed downstream in the turn direction.

In such a configuration, the working fluid is even less likely to flow into the gaps. Additionally, in configurations in which the sealing air is supplied from the gaps, loss of the flow of the primary flow can be further decreased.

A vane segment of a twenty-second aspect of the present invention has a configuration similar to that of any one of the eighteenth aspect to the twenty-first aspect, except that a groove in which a seal member is held is formed in one of the end surfaces and the inclined portion is formed on the flow path side of the groove.

In a configuration in which the seal member is disposed as such, the gaps are inclined on the flow path side of the gaps. As a result, less of the working fluid flows into the gaps. Additionally, loss of the flow of the primary flow by the sealing air supplied from the gaps can be decreased.

A vane segment of a twenty-third aspect of the present invention has a configuration similar to that of any one of the eighteenth aspect to the twenty-second aspect, except that the end surfaces each include a radially extending surface, and the inclined portions incline from the radially extending surface on the flow path side and incline downstream in the turn direction.

A vane row of a twenty-fourth aspect of the present invention defines the flow path with a plurality of the vane segments of any one of the eighteenth aspect to the twenty-third aspect being disposed in the rotational direction to form an annular shape.

A gas turbine of a twenty-fifth aspect of the present invention includes the vane row of the twenty-fourth aspect.

In such a configuration, less of the working fluid flows into the gaps between the adjacent inner shrouds and outer shrouds. Additionally, loss of the flow of the primary flow by the sealing air supplied from the gaps can be decreased.

INDUSTRIAL APPLICABILITY

The blade or vane row described above can decrease loss of the flow of the working fluid and can increase efficiency.

REFERENCE SIGNS LIST

1 Gas turbine
2 Compressor
3 Turbine portion
4 Rotating shaft
5 Casing
7 Vane row (blade or vane row)
8 Blade row
9 Combustor
10 Vane segment (blade or vane segment)
11 Blade or vane body
11a Ventral surface portion
11b Dorsal surface portion
12 Inner end wall portion
13 Outer end wall portion
15A, 15B, 15C, 15D Opposing surface (end surface)
16 Inclined portion
16a First inclined portion
16b Second inclined portion
17F, 17Fa, 17Fb End wall surface
20 Seal member
21 Groove
A Sealing air
G Combustion gas (working fluid)
R Primary flow path
S Gap

The invention claimed is:

1. A blade or vane segment comprising:
an end wall portion that faces a flow path along which a working fluid flows; and
a blade or vane body extending from the end wall portion, the blade or vane body being disposed in the flow path; wherein
the working fluid generally flows in an axial direction of a rotating shaft of a gas turbine while also flowing in a rotational direction of the rotating shaft,
the end wall portion extends in the rotational direction,
end surfaces of the end wall portion in the rotational direction each include an inclined portion,
the inclined portions of the end surfaces are inclined in a direction of the rotational direction of the rotating shaft; and
at least one inclined portion includes:
a first inclined portion connected to an end wall surface of the end wall portion facing the flow path and having a planar shape; and
a second inclined portion connected to the first inclined portion and forming a planar shape; and
an angle formed by the end wall surface and the second inclined portion is larger than an angle formed by the end wall surface and the first inclined portion.

2. A blade or vane segment comprising:
an end wall portion that faces a flow path along which a working fluid flows; and
a blade or vane body extending from the end wall portion, the blade or vane body being disposed in the flow path; wherein
the working fluid flows through the flow path while turning, the working fluid flows in an axial direction of a rotating shaft of a gas turbine while flowing in a rotational direction of the rotating shaft,
the end wall portion extends in the rotational direction,
end surfaces of the end wall portion in the rotational direction each include an inclined portion,
the inclined portions of the end surfaces are inclined in a direction of the rotational direction of the rotating shaft; and
an end wall surface facing the flow path of the end wall portion is formed to be a step so that a region of the end wall surface disposed on the upstream of the end wall in the rotational direction is disposed on the side apart from the flow path with respect to a region of the end wall surface disposed on the downstream of the end wall in the rotational direction in a surface of the end wall portion facing the flow path.

3. The blade or vane segment according to claim 1, wherein
the inclined portion of the end surface disposed on an upstream side of the end wall portion in the rotational direction is inclined at a greater degree toward the downstream of the end wall portion in the rotational direction as it approaches the flow path than the inclined portion of the end surface disposed on a downstream side of the end wall portion in the rotational direction.

4. The blade or vane segment according to claim 1, wherein a seal member holding groove is formed in one of the end surfaces, and the inclined portions of the end surfaces are formed on a side closer to the flow path with respect to the groove when viewed from the axial direction.

5. The blade or vane segment according to claim 1, wherein the end surfaces include a radially extending surface, and the inclined portions of the end surfaces are formed at a position closer to the flow path than the radially extending surface when viewed from the radial direction.

6. A blade or vane row comprising:
a plurality of the blade or vane segments according to claim 1, the plurality of blade or vane segments being disposed in the rotational direction to form an annular shape and defining the flow path.

7. A gas turbine comprising:
the blade or vane row according to claim 6.

8. A blade or vane segment comprising:
an end wall portion that faces a flow path along which working fluid flows; and
a blade or vane body radially extending from the end wall portion; wherein
the working fluid generally flows in an axial direction of the rotating shaft of a gas turbine while also flowing in a rotational direction of the rotating shaft,
the end wall portion extends in the rotational direction,
the end wall portion has an acute angle formed by an end surface of the end wall portion adjacent to a concave ventral surface portion of the blade or vane body and by an end wall surface, which is the surface from which the blade or vane body extends when viewed from the axial direction,
the end surface includes:
a first inclined portion connected to the end wall surface and having a planar shape; and
a second inclined portion connected to the first inclined portion and forming a planar shape; and
an angle formed by the end wall surface and the second inclined portion is larger than an angle formed by the end wall surface and the first inclined portion.

9. A blade or vane segment comprising:
an end wall portion that faces a flow path along which working fluid flows; and
a blade or vane body radially extending from the end wall portion; wherein
the working fluid flows through the flow path while turning, since the working fluid flows in an axial direction of a rotating shaft of a gas turbine while flowing in a rotational direction of the rotating shaft,
the end wall portion extends in the rotational direction,
the end wall portion has an acute angle formed by an end surface of the end wall portion adjacent to a concave ventral surface portion of the blade or vane body and by an end wall surface, which is the surface from which the blade or vane body extends when viewed from the axial direction,
the end wall surface is formed to be a step so that a region of the end wall surface disposed on the upstream of the end wall in the rotational direction is disposed on the side apart from the flow path with respect to a region of the end wall surface disposed on the downstream of the end wall in the rotational direction in a surface of the end wall portion facing the flow path.

* * * * *